(12) United States Patent
Prenderville

(10) Patent No.: US 6,444,909 B1
(45) Date of Patent: Sep. 3, 2002

(54) DECORATIVE SWITCHPLATE PROCESSES AND DECORATIVE SWITCHPLATE KIT

(76) Inventor: Gerald F. Prenderville, 100 Seaview Ave., Bldg. 3-16, Monmouth Beach, NJ (US) 07750

(*) Notice: Subject to any disclaimer, the term of this patent is extended or adjusted under 35 U.S.C. 154(b) by 0 days.

(21) Appl. No.: 09/922,821

(22) Filed: Aug. 6, 2001

(51) Int. Cl.[7] .................................................. H02G 3/14
(52) U.S. Cl. ........................... 174/66; 174/67; 220/241; 220/242
(58) Field of Search ..................... 174/66, 67; 220/241, 220/242; D8/353

(56) References Cited

U.S. PATENT DOCUMENTS 3,953,933 A * 5/1976 Goldstein ................. 174/66 X
4,353,759 A * 10/1982 Stallings ................. 220/241 X
4,760,227 A * 7/1988 Boxer ........................ 200/330
5,675,125 A * 10/1997 Hollinger ..................... 174/66
6,278,062 B1 * 8/2001 Sowdon ........................ 174/66

FOREIGN PATENT DOCUMENTS

JP           1021774       * 1/1998

* cited by examiner

Primary Examiner—Dean A. Reichard
Assistant Examiner—Dhiru R Patel
(74) Attorney, Agent, or Firm—R. Gale Rhodes, Jr.

(57) ABSTRACT

The present invention may include a switchplate provided with an opening surrounded by a front surface provided with a first portion of a decorative design, and a decorative design member provided with a second portion of the decorative design and for being applied to the front surface of an electric switch received within the opening to provide a complete, or at least substantially complete, decorative design; and processes of making the same and a decorative design switchplate kit comprising the same.

5 Claims, 2 Drawing Sheets

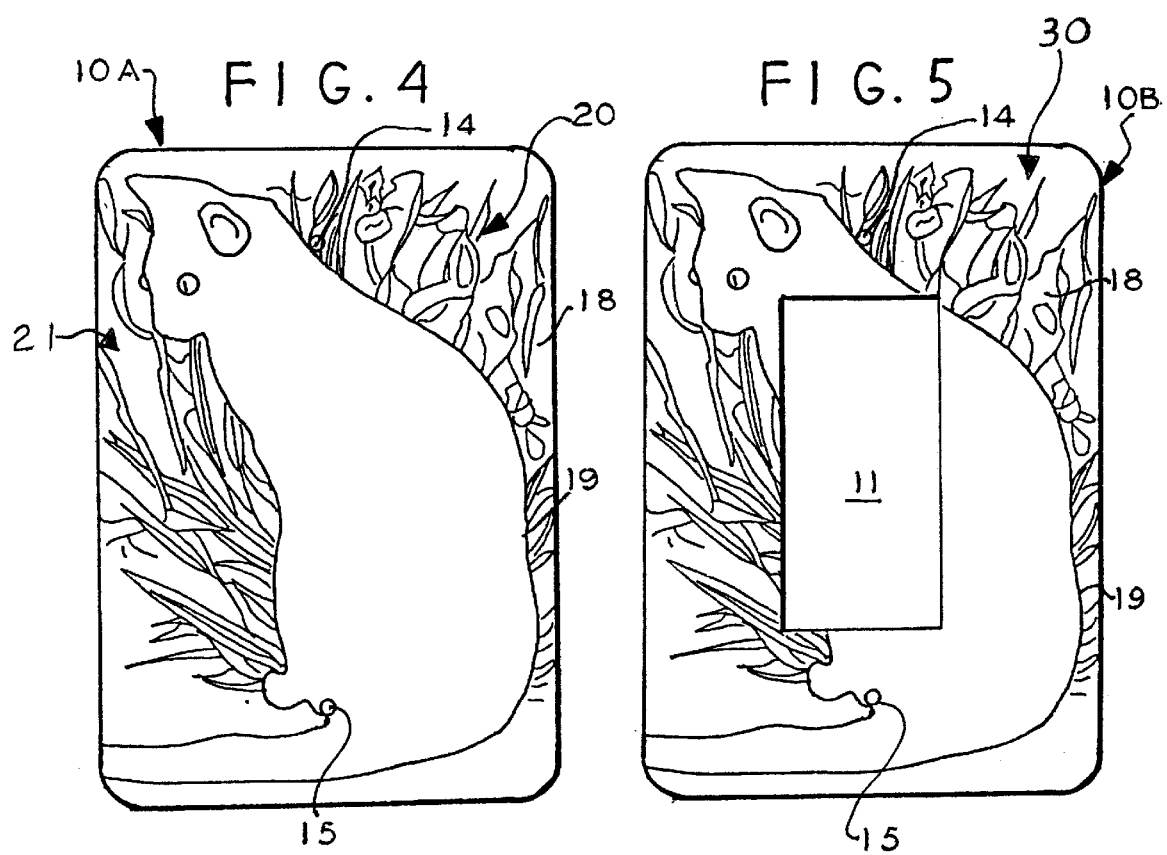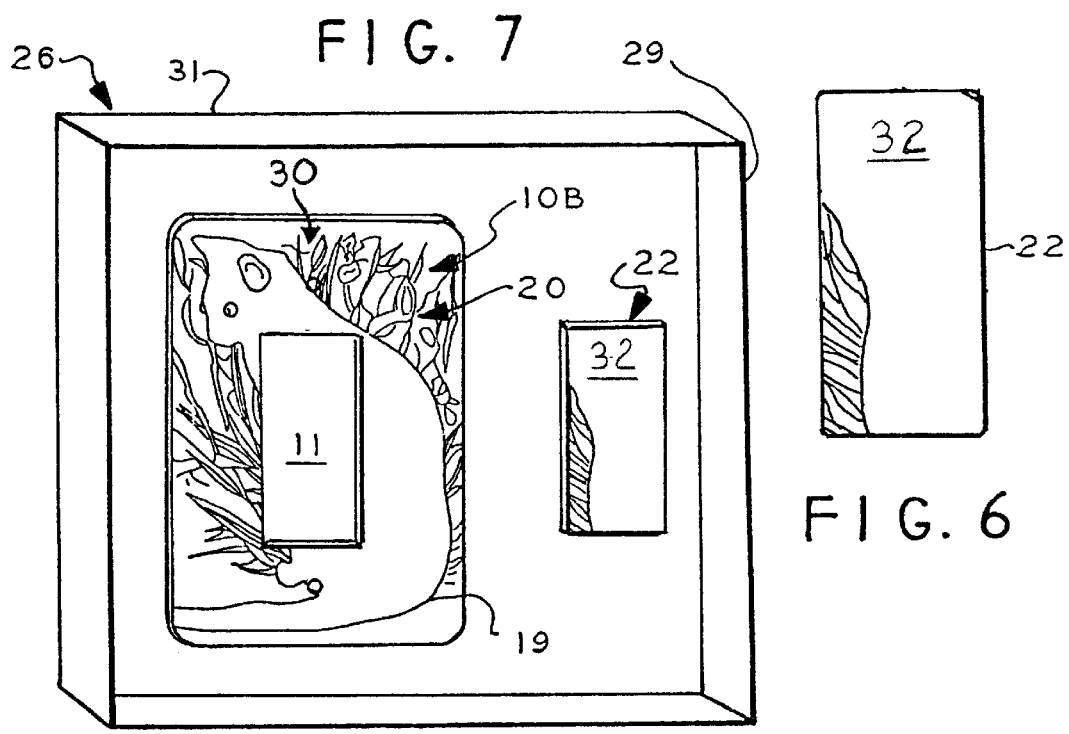

DECORATIVE SWITCHPLATE PROCESSES AND DECORATIVE SWITCHPLATE KIT

BACKGROUND OF THE INVENTION

This invention relates to a process providing a decorative switchplate, a process for manufacturing a decorative switchplate and a decorative switchplate kit.

Numerous decorative switchplates are known to the prior art. Typically, the prior art decorative switchplate comprises a switchplate having an opening for receiving and electric switch for turning a light on and off and which switchplate is provided with a decorative design on its front surface surrounding the opening for receiving the electrical switch. Upon such prior art decorative switchplate being mounted over an electrical switch, which typically does not include any design, the result is an incomplete decorative design due to the absence of a decorative design on the electric switch. This is particularly significant with decorative switchplates for use with the electric switch typically referred to in the art as a rocker electric switch. The typical prior art rocker electric switch is generally much larger than the prior art toggle switch and includes a rather large exposed front surface without any decorative design. Thus, upon the typical prior art decorative switchplate being mounted over the typical prior art rocker electric switch there results in an incomplete decorative design due to the absence of a decorative design on the front surface of the rocker electric switch.

Accordingly, there is a need in the decorative switchplate art for a decorative switchplate, particularly for use with a rocker electric switch, which provides a complete decorative design. There is a further need in the art for a process for providing a decorative switchplate, a process for manufacturing a decorative switchplate and a decorative switchplate kit.

SUMMARY OF THE INVENTION

It is the object of present invention to satisfy the foregoing needs in the decorative switchplate art.

The present invention may include a switchplate provided with an opening surrounded by a front surface provided with a first portion of a decorative design, and a decorative design member provided with a second portion of the decorative design and for being applied to the front surface of an electric switch received within the opening to provide a complete, or at least substantially complete, decorative design; and processes of making the same and a decorative design switchplate kit comprising the same.

DESCRIPTION OF THE DRAWINGS

FIG. 4 is a switchplate of FIG. 1 provided with a complete decorative design which covers both the switchplate and the opening provided in the switchplate for receiving an electric switch;

FIG. 5 is the decorative switchplate of FIG. 3 with the portion of the decorative design covering the opening shown in FIG. 1 removed;

FIGS. 6 is the portion of the decorative design removed from FIG. 5 and providing a decorative portion or member; and FIG. 7 is a decorative switchplate design kit of the present invention including the switchplate of FIG. 5 and the removed decorative design portion or member of FIG. 6 packaged together in a package.

DESCRIPTION OF THE PREFERRED EMBODIMENT

Figure 1:
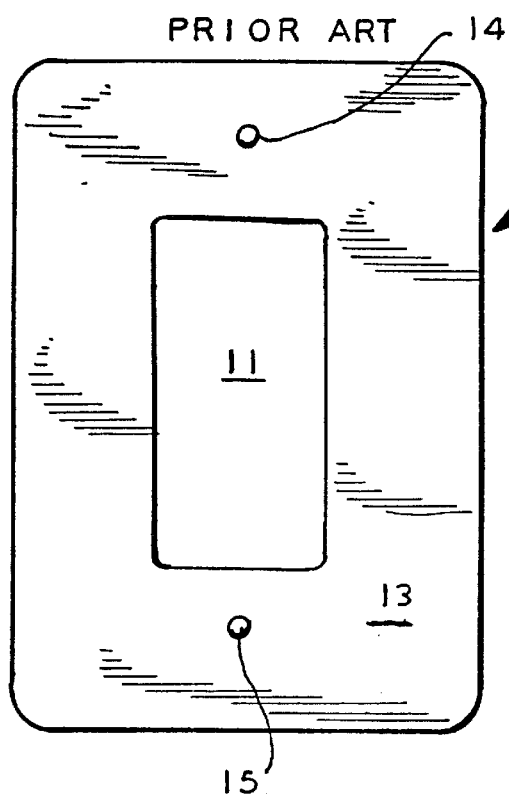
FIG. 1 is a front view of a typical prior art switchplate for being mounted over a rocker electric switch.

Referring to FIG. 1, a commercially available prior art switchplate is shown and identified by general numerical designation 10. The switchplate 10 is provided with an opening 11 for receiving the front portion of an electric switch, such as for example the rocker electric switch indicated by general numerical designation 12 in FIG. 2; the switchplate 10, FIG. 1, includes a front surface 13 surrounding the opening 11. The switchplate 10 of FIG. 1 also may be provided with a pair of small openings 14 and 15 as known to the art for receiving a pair of screws, not shown, for mounting the switchplate 10 over the rocker electric switch 12 of FIG. 2 with the front surface 16 (FIG. 2) of the rocker switch 12 being exposed through the opening 11 provided in the switchplate 10. The switchplate 10 may be, for example, made of metal or plastic.

Figure 2:
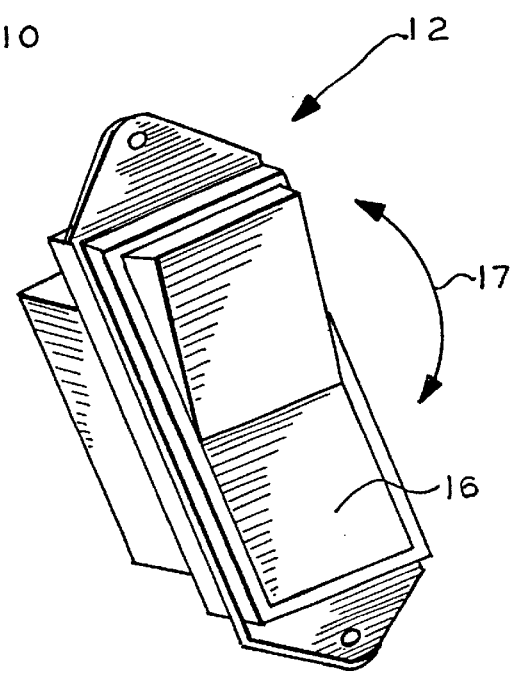
FIG. 2 is a diagrammatical view of a typical prior art rocker electric switch.

Referring further to FIG. 2, the rocker switch 12, as is known to the art, is rocked upwardly and downwardly as indicated by the double-headed curved arrow 17 in FIG. 2 to turn a light on and off.

Figure 3:
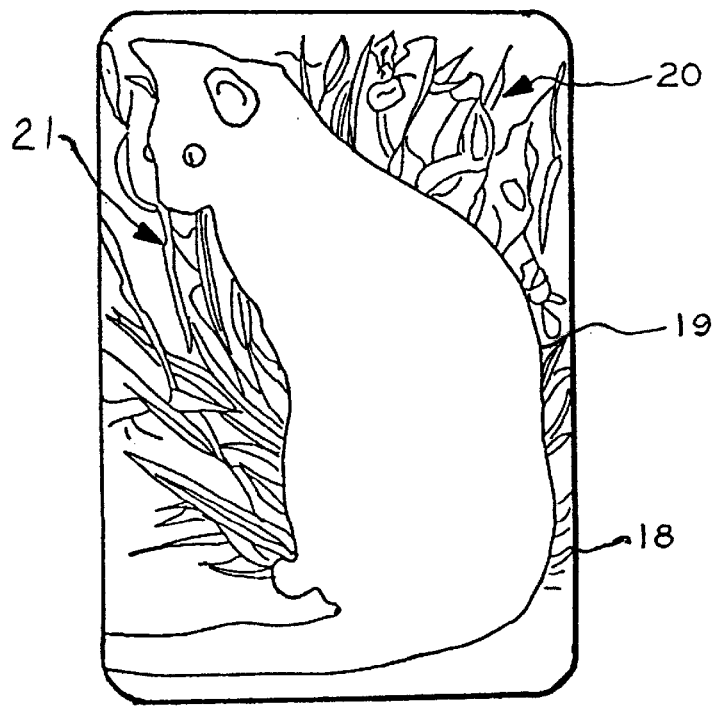
FIG. 3 is a front view of a decorative design prepared for application to the switchplate of FIG. 1.

The processes of the present invention will be described with regard to FIGS. 3–6. Referring to FIG. 3, the front surface of a suitable layer of material 18, such as for example and not by way of limitation, 28 pound paper, is provided with a complete decorative design 21 by anyone of several decorative design transfer processes known to the art, such by way of example, a photographic transfer process. The decorative design 21, for example, and not by way of limitation, may include a cat 19 sitting in front of some flowers indicated by general numerical designation 20. The rear surface of the layer of material 18 may be provided with a suitable coating of adhesive, of the type known to the art, for adhering the rear surface of the material 18 to the front surface 16 of the switchplate 10 shown in FIG. 1. The layer of material 18 provided with the complete decorative design 21 covers the entire front surface 13 of the switchplate 10, FIG. 1, and also covers the switchplate opening 11 shown in FIG. 1. These process steps provide the switchplate indicated by general numerical designation 10A in FIG. 4.

Thereafter, the portion of the material 18 and decorative design overlying the switchplate opening 11 (FIG. 1) is suitably removed, for example, and not by way of limitation, manually such as by utilizing a suitable sharp edged cutting implement; alternatively, the portion of the materials 18 and a decorative design overlying the switchplate opening 11 of FIG. 1 may be suitably removed by die cutting and by die cutting apparatus known to the art. The portion of the material 18 and decorative design removed is retained as a decorative design portion or a decorative design member and is shown in FIG. 6 and identified by general numerical designation 22. The removal of the decorative design portion or member 22 provides a decorative switchplate 10B shown in FIG. 5 whose front surface is now provided. with only a portion 30 of the complete decorative design 21 shown in FIG. 3 or with an incomplete decorative design 30 due to the removal of the portion or member 22 shown in FIG. 6.

Thereafter, the switchplate 10B of FIG. 4 having the incomplete decorative design may be mounted over the rocker electric switch 12 shown in FIG. 2, which rocker electric switch 12 will have been previously suitably mounted in an opening provided in a wall in a manner known to the art. Specifically, the switchplate 10B having the incomplete decorative design may be mounted over the rocker electric switch 12 by the above-mentioned screws, not shown, being inserted through the openings 14 and 15 shown in FIG. 4 and screwed into the typical receptacle holding the rocker electric switch 12 in a manner known to the art.

The front surface of the decorative design portion or member 22, of FIG. 5, will be provided with a portion 32 of a complete decorative design 21 shown in FIGS. 3 and 4 and the rear surface of the decorative design portion or member 22 may have its rear surface covered with a suitable adhesive of the type known to the art for adhering or securing the decorative portion or member 22 to the exposed surface 16 of electric switch 12, FIG. 2. Upon the decorative design portion or member 22 being adhered to the exposed front surface 16 of the rocker electric switch 12, the portion 32 of the decorative design provided on the front surface of the decorative design portion or member 22 and the portion 30 of the decorative design provided on the front surface of the switchplate 10B (FIG. 5) will co-operatively substantially provide the complete decorative design 21 shown in FIGS. 3 and 4. Viewed differently, upon the decorative design member or portion 22 being applied to the front surface 16 of the rocker switch 12, FIG. 2, the decorative design of FIGS. 3 and 4 will again be substantially complete and the switchplate 10A and decorative design portion or member 22 will co-operatively provide a complete, or re-completed, decorative design.

A switchplate kit of the present invention is shown in FIG. 7 and identified by general numerical designation 26. The decorative switchplate kit 26 includes the switchplate 10B of FIG. 5 whose front surface is provided with the incomplete decorative design portion as described above and the decorative design portion or member 22 shown in FIG. 5 whose front surface is provided with the incomplete decorative design portion as described above. As noted above, the rear surface of the decorative design portion or member 22 may have been provided with the above-noted adhesive for applying the decorative design portion 22 to the front surface 16 of electric switch 12 of FIG. 2 and such adhesive may be suitably and temporarily, for packaging and transport, covered with a layer of release material (not shown) of the type known to the art for packaging of the member 22 in the kit 26 prior to being mounted to rocker electric switch 12 as described above. The switchplate 10B and the decorative design portion or member 22 may be packaged in a suitable transparent plastic container 29, of the type known to the art with the upper portion 31 of the package 29 being suitably sealed, such as for example, by heat sealing.

Further, switchplates are known to the prior art having two or more openings for mounting the switchplate over two or more switches such as two or more rocker switches of the type shown in FIG. 2. Accordingly, it will be further understood that the teachings of the present invention may be utilized to provide a switchplate provided with two or more openings and two or more electric switches, such as two or more electric rocker switches, with a complete, or at least substantially complete, decorative design.

It will be understood many variations and modifications may be made in the present invention without departing from the spirit and scope thereof.

What is claimed is:

1. Process of providing a switchplate and an electric switch with a complete decorative design, comprising the steps of:

providing a switchplate having at least one opening for receiving at least one electric switch;

applying a complete decorative design over said switchplate and over said at least one opening;

removing the portion of said complete decorative design overlying said at least one opening to provide a switchplate having an incomplete decorative design and a decorative design portion formerly overlying said at least one opening;

mounting said switchplate having said incomplete decorative design over at least one electric switch with the at least one electric switch being received in said at least one opening and with a portion of the at least one electric switch being exposed through said at least one opening; and applying said decorative portion to the exposed portion of the electric switch to provide a re-complete decorative design including the incomplete decorative design on the switchplate and the decorative design portion applied to the electric switch.

2. Process of providing a switchplate and an electric switch with a complete decorative design, comprising the steps of:

providing a switchplate having an opening for receiving an electric switch, said switchplate including a front surface surrounding said opening;

covering said front surface and said opening with a complete decorative design;

removing the portion of the complete decorative design overlying said opening to provide a decorative design member having a front surface provided with a first portion of said complete decorative design and a switchplate having a front surface provided with a second portion of said complete decorative design;

mounting said switchplate with said front surface having said second portion of said complete decorative design over an electric switch having a front surface exposed through said opening; and applying said removed decorative design member to said exposed surface of said electric switch to substantially restore said re-complete said complete decorative design.

3. Process of providing a decorative design switchplate kit, comprising steps of:

providing a switchplate having an opening and a front surface surrounding said opening;

applying a decorative design over said front surface of said switchplate and over said opening;

removing the portion of the decorative design overlying said opening to provide a decorative design member having a front surface provided with a portion of said decorative design and a switchplate provided with a portion of said decorative design;

applying an adhesive to the rear surface of said decorative design member and covering said adhesive with a layer of release paper; and packaging said switchplate having a portion of said decorative design and said decorative design member having a portion of said decorative design in a package.

4. A decorative design switchplate kit, comprising:

a switchplate having an opening formed therein for receiving an electric switch and including a front surface provided with a first portion of a decorative design surrounding said opening; and a decorative design member having a front surface provided with a second portion of the decorative design for being mounted to an electric switch received within said opening, the combination of said first portion of said decorative design and said second portion of said decorative design co-operatively providing a substantially complete decorative design.

5. A decorative design switchplate kit, comprising;

a switchplate provided with at least one opening for receiving the forward portion of at least one electric switch having a front surface which will reside in said opening upon said switchplate being mounted over the electric switch, said switchplate having a front surface surrounding said at least one opening, and a first portion of a complete decorative design applied to said front surface of said switchplate; and at least one decorative design member including a front surface and a rear surface, said front surface provided with a second portion of he complete design and said rear surface of said at least one decorative design member for being mounted to exposed front surface of the at least one electric switch upon said switchplate being mounted over the at least one electric switch, said first portion of said complete decorative design and said second portion of said complete decorative design cooperatively providing the complete decorative design.

* * * * *